United States Patent
Miki et al.

(10) Patent No.: US 9,016,162 B2
(45) Date of Patent: Apr. 28, 2015

(54) BICYCLE COMPONENT OPERATING DEVICE

(75) Inventors: Yoshimitsu Miki, Osaka (JP); Kazutaka Fukao, Osaka (JP)

(73) Assignee: Shimano Inc., Osaka (JP)

( * ) Notice: Subject to any disclaimer, the term of this patent is extended or adjusted under 35 U.S.C. 154(b) by 706 days.

(21) Appl. No.: 12/164,159

(22) Filed: Jun. 30, 2008

(65) Prior Publication Data

US 2009/0320636 A1    Dec. 31, 2009

(51) Int. Cl.
*B62K 23/06* (2006.01)
*B62L 3/02* (2006.01)
*B62M 25/04* (2006.01)
*B60T 11/04* (2006.01)

(52) U.S. Cl.
CPC ........... *B62K 23/06* (2013.01); *Y10T 74/20287* (2015.01); *Y10T 74/20438* (2015.01); *B62M 25/04* (2013.01); *B60T 11/046* (2013.01); *B62L 3/02* (2013.01)

(58) Field of Classification Search
CPC ......... B62L 3/02; B62M 25/00; B62M 25/02; B62M 25/045; B62K 23/02; B62K 23/06; F16C 1/26; F16C 1/101; F16C 1/20; F16C 1/106
USPC .................. 74/488, 489, 502.2, 501.6, 502.4, 74/502.6, 502.5, 500.5; 248/66, 74.3, 314; 138/108, 117; 285/126.1, 131.1, 179.1, 285/179.2, 921
IPC .................................................. F16C 1/26, 1/10
See application file for complete search history.

(56) References Cited

U.S. PATENT DOCUMENTS

| | | | | |
|---|---|---|---|---|
| 2,186,181 A * | 1/1940 | Steinlein | ...................... | 74/502.5 |
| 2,494,814 A * | 1/1950 | Huth | ........................... | 174/70 R |
| 2,713,669 A * | 7/1955 | Cahn | .............................. | 439/457 |
| 3,398,600 A * | 8/1968 | White et al. | ................. | 74/502.4 |
| 4,295,618 A * | 10/1981 | Morota et al. | ............... | 248/74.3 |
| 4,325,269 A * | 4/1982 | Nagano | ........................ | 74/502.6 |
| 4,564,163 A * | 1/1986 | Barnett | ........................ | 248/74.3 |
| 5,050,444 A * | 9/1991 | Nishimura | .................... | 74/502.2 |
| 5,172,878 A * | 12/1992 | Lederman | .................... | 74/502.4 |
| 5,236,212 A * | 8/1993 | Duehring et al. | ............ | 74/502.4 |
| 5,431,255 A * | 7/1995 | Tsuchie | ........................ | 74/502.6 |
| 5,470,091 A * | 11/1995 | Voss et al. | .................. | 280/281.1 |
| 5,481,939 A * | 1/1996 | Bernardini | ................... | 74/502.4 |
| 5,535,969 A * | 7/1996 | Duffy, Jr. | ..................... | 248/68.1 |
| 6,354,545 B1 * | 3/2002 | Liao | ................................. | 248/73 |
| 6,725,978 B2 * | 4/2004 | Karpowich | .................. | 74/502.4 |
| 7,000,936 B2 * | 2/2006 | Schmider | ..................... | 74/502.6 |
| 2003/0230678 A1 * | 12/2003 | Bellmore et al. | ............ | 248/74.1 |
| 2006/0070480 A1 * | 4/2006 | Fujii | ............................. | 74/502.2 |
| 2006/0145446 A1 * | 7/2006 | Schmider | ................... | 280/281.1 |
| 2007/0137361 A1 * | 6/2007 | Fujii | ........................... | 74/473.13 |

* cited by examiner

*Primary Examiner* — Daniel Yabut
(74) *Attorney, Agent, or Firm* — Global IP Counselors

(57) ABSTRACT

A bicycle component operating device is basically provided with a base member, an operating member and an insert element. The base member includes a body member having a recess with an inner wire opening. The operating member is movably coupled with respect to the base member to operatively pull and release an inner wire. The insert element has a first channel portion and a second channel portion disposed in the recess of the body member.

21 Claims, 5 Drawing Sheets

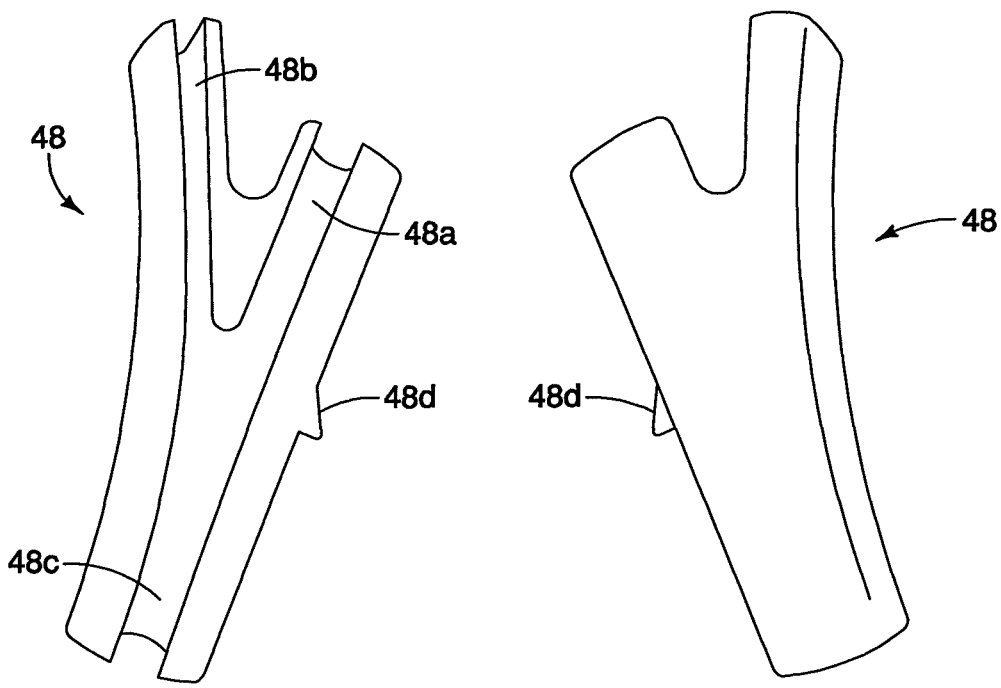
FIG. 9                    FIG. 10
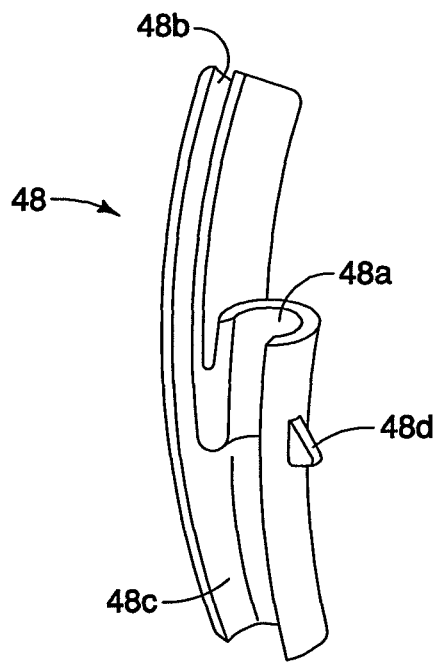
FIG. 11

BICYCLE COMPONENT OPERATING DEVICE

BACKGROUND OF THE INVENTION

1. Field of the Invention

This invention generally relates to a bicycle component operating device for a cable operated bicycle component. More specifically, the present invention relates to a bicycle component operating device in which the rider can change the routing path of the cable.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle, especially the bicycle component operating devices for performing shifting and/or braking operations.

Typically, bicycle shifters mechanically operate derailleurs via cables, while bicycle brake levers mechanically operate brake devices via cables. In either case, an operating force is typically applied by one of the rider's fingers to operate a control lever, which in turn transmits the operating force to a cable that is fixed at one end to the control lever and fixed at the other end to the bicycle component (e.g., derailleur or brake devices). Typically, the cables are routed along the handlebar. However, there are many different types of handlebar arrangements. Thus, sometimes it may be difficult to obtain the optimum cable route path when using a particular style handlebar with a particular style of shifter.

In view of the above, it will be apparent to those skilled in the art from this disclosure that there exists a need for an improved bicycle component operating device for operating a bicycle component. This invention addresses this need in the art as well as other needs, which will become apparent to those skilled in the art from this disclosure.

SUMMARY OF THE INVENTION

One object of the present invention is to provide a bicycle control (component actuating) device that bicycle component operating device in which the rider can change the routing path of the cable.

The foregoing objects can basically be attained by providing a bicycle component operating device that basically comprises a base member, an operating member and an insert element. The base member includes a body member having a recess with an inner wire opening. The operating member is movably coupled with respect to the base member to operatively pull and release an inner wire. The insert element has a first channel portion and a second channel portion disposed in the recess of the body member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 9 is an enlarged top view of the insert element of the body member of the left bicycle component (brake/shift) operating device;

FIG. 10 is an enlarged bottom view of the insert element of the body member of the left bicycle component (brake/shift) operating device; and FIG. 11 is an enlarged side view of the insert element of the body member of the left bicycle component (brake/shift) operating device.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
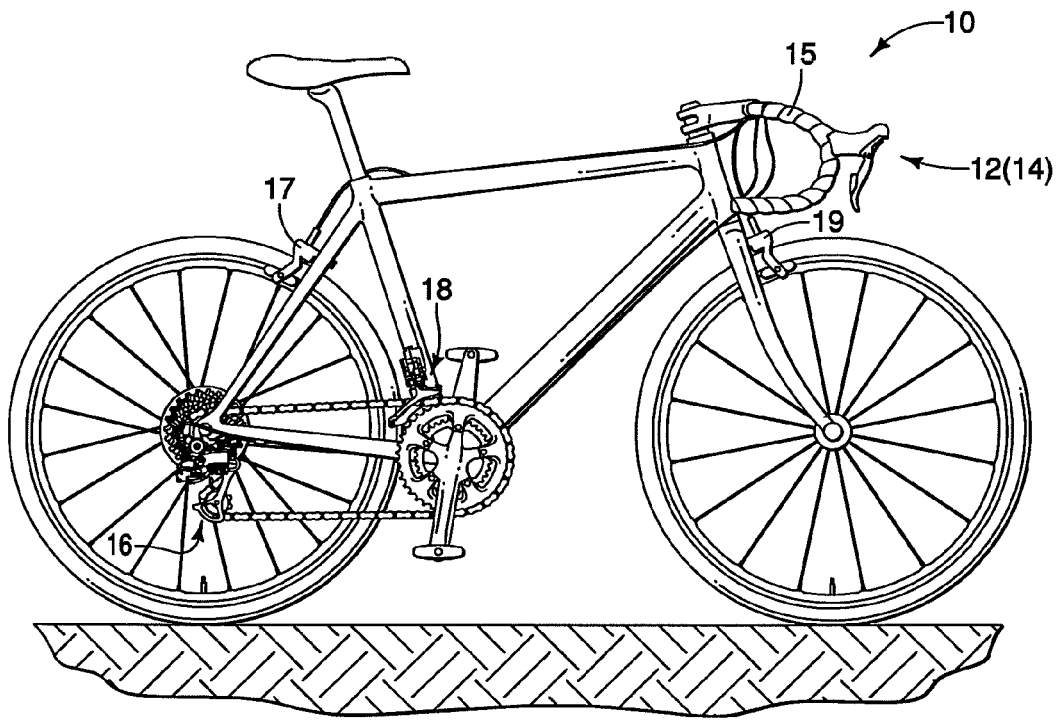
FIG. 1 is a side elevational view of bicycle equipped with a bicycle component (brake/shift) operating device coupled to a drop type handlebar in accordance with a preferred embodiment.
Figure 2:
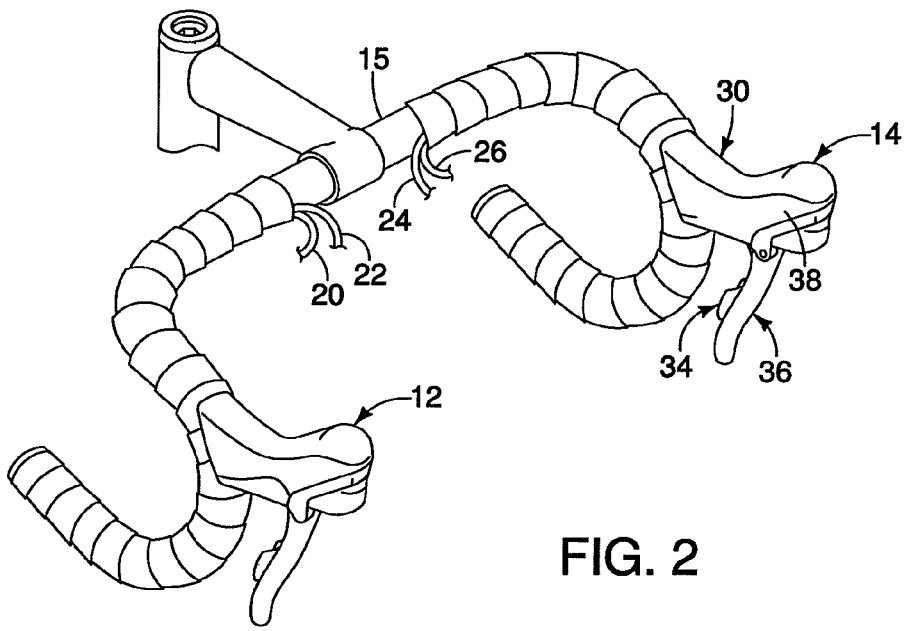
FIG. 2 is an enlarged perspective view of the drop type handlebar with the bicycle component operating device in accordance with the illustrated embodiment.

Referring initially to FIGS. 1 and 2, a bicycle 10 is illustrated in accordance with a pair of bicycle component operating devices 12 and 14 mounted on a bicycle handlebar 15 in accordance with one embodiment of the present invention. The bicycle component operating device 12 is a right hand side control device operated by the rider's right hand to operate a rear derailleur 16 and a rear brake device 17, while the bicycle component operating device 14 is a left hand side control device operated by the rider's left hand to operate a front derailleur 18 and a front brake device 19. In the illustrated embodiment, the bicycle component operating device 12 is operatively coupled to the rear derailleur 16 via a shift control cable 20 and the rear brake device 17 via a brake control cable 22. The bicycle component operating device 14 is operatively coupled to the front derailleur 18 via a shift control cable 24 and the front brake device 19 via a brake control cable 26. Preferably, the control cables 20, 22, 24 and 26 are conventional bicycle operating cables that have an outer casing the covers an inner wire. In other words, each of the control cables 20, 22, 24 and 26 basically includes an inner wire slidably received within an outer casing. For example, as seen in FIGS. 3 and 4, the shift control cable 24 has an inner wire 24a with an outer casing 24b covering the inner wire 24a.

Alternatively, the bicycle component operating devices 12 and 14 can be switched so that the rider can operate the rear and front derailleurs 16 and 18 with opposite hands and/or operate the rear and front brake devices 17 and 19 with opposite hands.

In the illustrated embodiment, the right and left hand side bicycle component operating devices 12 and 14 are essentially identical in operation, except that they are mirror images of each other and they have a different number of shift positions. In other words, the left hand side bicycle component operating device 14 is substantially identical to the right hand side bicycle component operating device 12, except for the shifting unit (not shown) of the right hand side bicycle component operating device 12 has been modified to be a mirror image and to increase the number of gears that can be shifted. Thus, only the left hand side bicycle component operating device 14 will be discussed and illustrated herein.

Figures 3, 4:
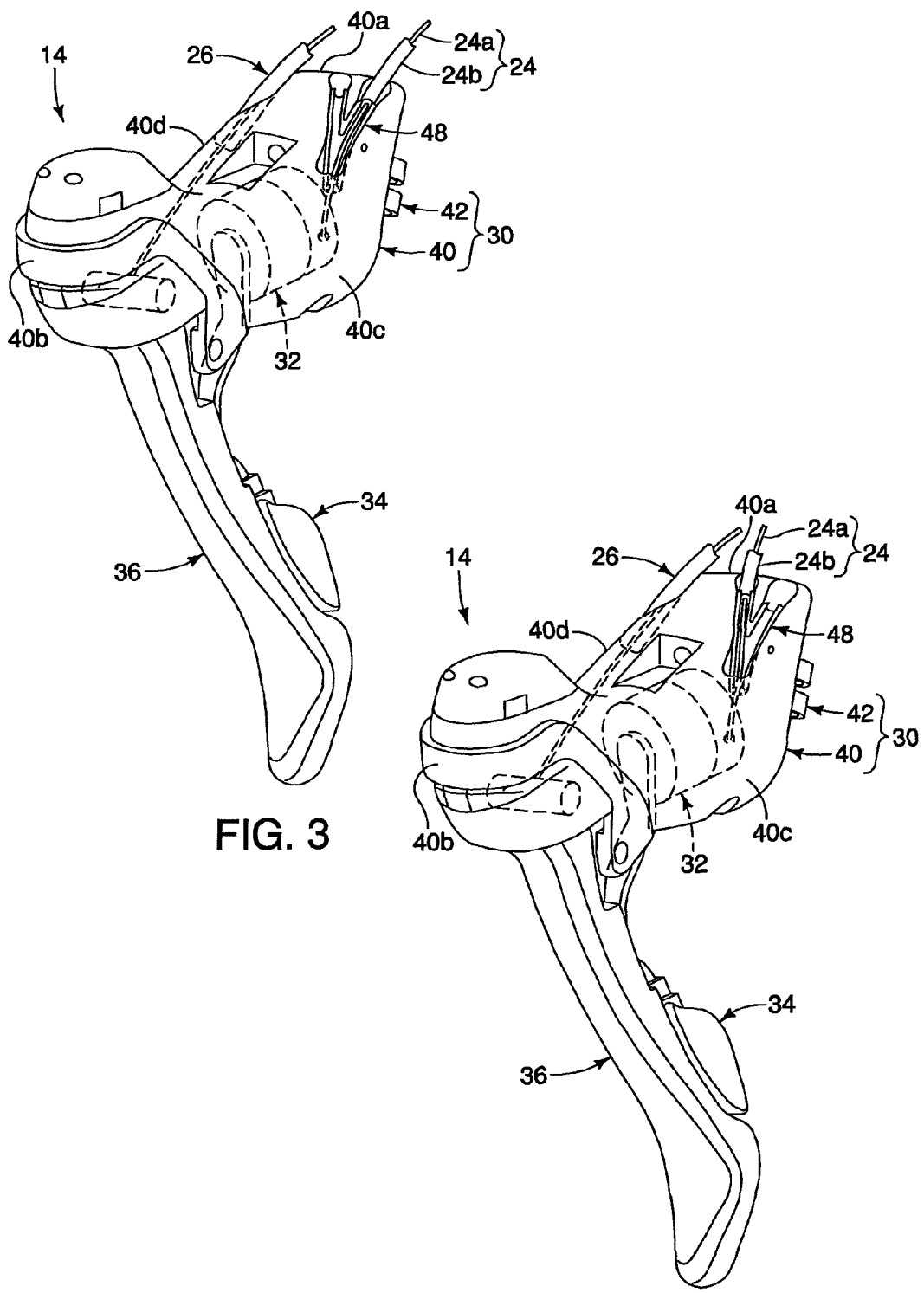
FIG. 3 is an outside elevational view of the left bicycle component operating device with the shift operating cable in a first cable routing path.
FIG. 4 is an outside perspective view of the left bicycle component operating device with the shift operating cable in a second cable routing path.

Referring now to FIGS. 2 to 4, the left hand side bicycle component operating device 14 basically includes a bracket or base member 30, a shift control unit 32, a shift lever 34 and a brake lever 36. As seen in FIG. 2, the bicycle component operating device 14 is fixedly mounted to the handlebar 15 by the base member 30. Basically, the base member 30 is a stationary member that houses the shift control unit 32, with both the shift lever 34 and the brake lever 36 being movable with respect to the base member 30. The base member 30 has an outer elastomeric cover 38, as seen in FIG. 2, that covers the gripping portion of the base member 30. This outer elastomeric cover 38 has been removed in FIGS. 3 to 8.

The shift control unit 32 is mounted to the base member 30 with the shift lever 34 (i.e., an operating member) being operatively coupled to the shift control unit 32. It will be apparent to those skilled in the art from this disclosure that a base member incorporating the present invention can be used to house a wide variety of shift control unit 32. Thus, the precise construction of the shift control unit 32 is not relevant, and thus, the construction of portions of the shift control unit 32 will not be discussed or illustrated in detail. While only a single shift lever (i.e., the shift lever 34) is diagrammatically illustrated for operating the shift control unit 32, two shift levers could be used with a base member incorporating the present invention for operating the shift control unit 32 as needed and/or desired. Moreover, while the brake lever 36 is illustrated as being pivotally coupled to the base member 30 in a longitudinal direction of the base member 30 for performing a braking function by pulling an inner wire 26a of the brake control cable 26, the brake lever 36 can also be configured to have a dual function of acting as both a braking lever and as a shift lever such as those manufactured by Shimano, Inc. Thus, the brake lever 36 could also be pivotally mounted to the base member 30 and operatively coupled to the shift control unit 32 such that pivoting in a transverse direction of the base member 30 performs a shifting operation, if needed and/or desired. In any event, at least the shift lever 34 constitutes a cable operating member that is movably coupled with respect to the base member 30 to operatively pull and release an inner wire 24a of the shift control cable 24.

The base member 30 includes a body member 40 and a handlebar mounting structure 42. The body member 40 is fixedly mounted to the handlebar 15 by the handlebar mounting structure 42. The handlebar mounting structure 42 is preferably a conventional band clamp or similar structure that is used in a road shifter for mounting to a drop down style handlebar such as the handlebar 15 shown in FIGS. 1 and 2. Thus, the handlebar mounting structure 42 will not be discussed in detail herein.

Figure 5:
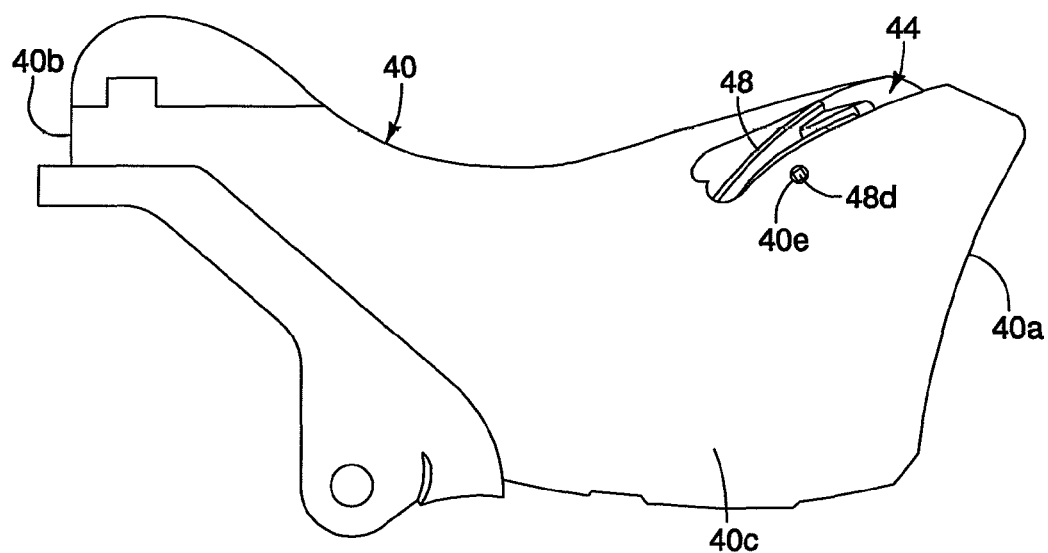
FIG. 5 is an outside elevational view of the body member of the left bicycle component (brake/shift) operating device.
Figure 6:
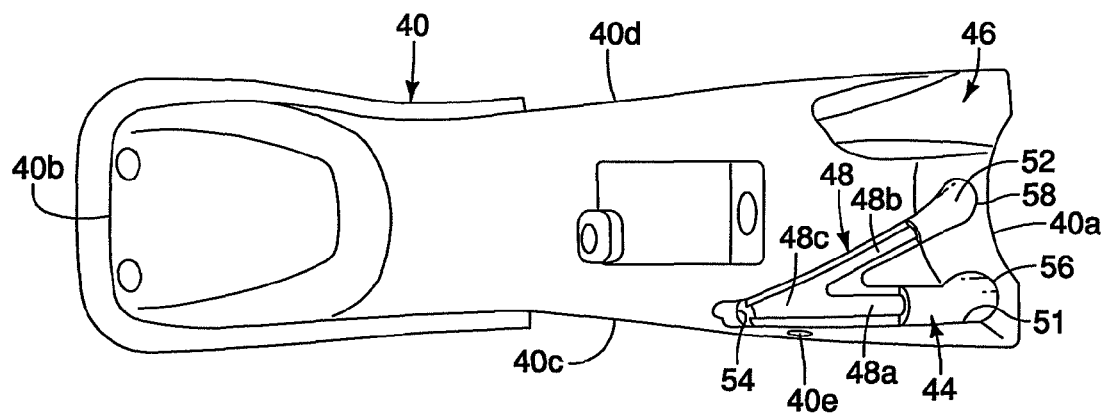
FIG. 6 is a top plan view of the body member of the left bicycle component (brake/shift) operating device.

As best seen in FIGS. 5 and 6, the body member 40 has a first (mounting) end portion 40a, a second (free) end portion 40b, an outer side wall 40c and an inner side wall 40d. The handlebar mounting structure 42 extends outwardly from first end portion 40a. The shift lever 34 and the brake lever 36 extend downwardly from the second end 40b. The side walls 40c and 40d extend between the end portions 40a and 40b. Typically, the body member 40 is constructed of one or more pieces of a hard rigid plastic that functions as housing for enclosing the shift control unit 32. For example, the body member 40 is formed of nylon with a carbon filler to provide a strong member that the rider can lean on the body member 40 during riding. The body member 40 is a road style bracket that functions as a gripping member for the rider's hand.

Figure 7:
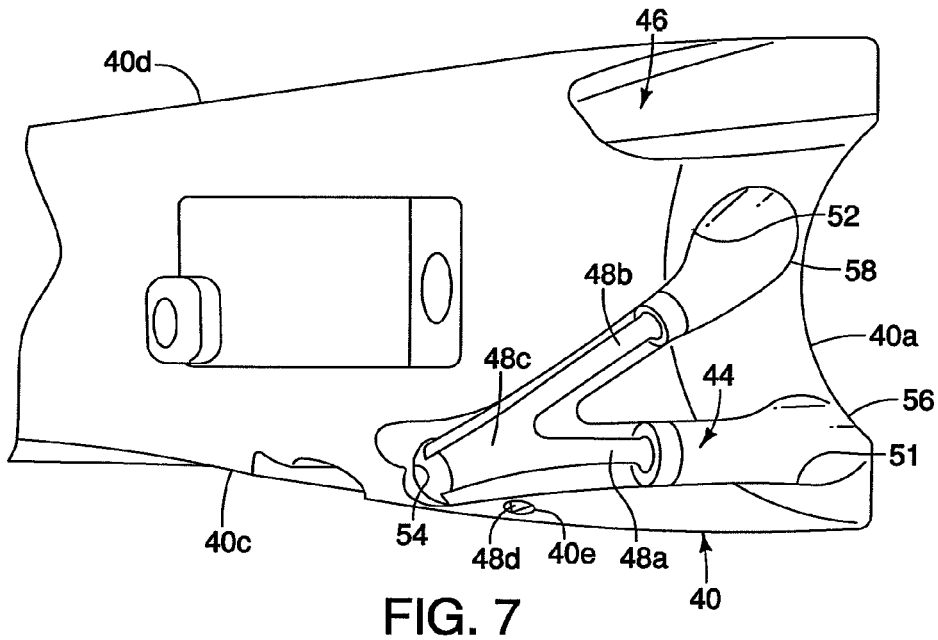
FIG. 7 is a partial top plan view of the attachment end of the body member of the left bicycle component (brake/shift) operating device.
Figure 8:
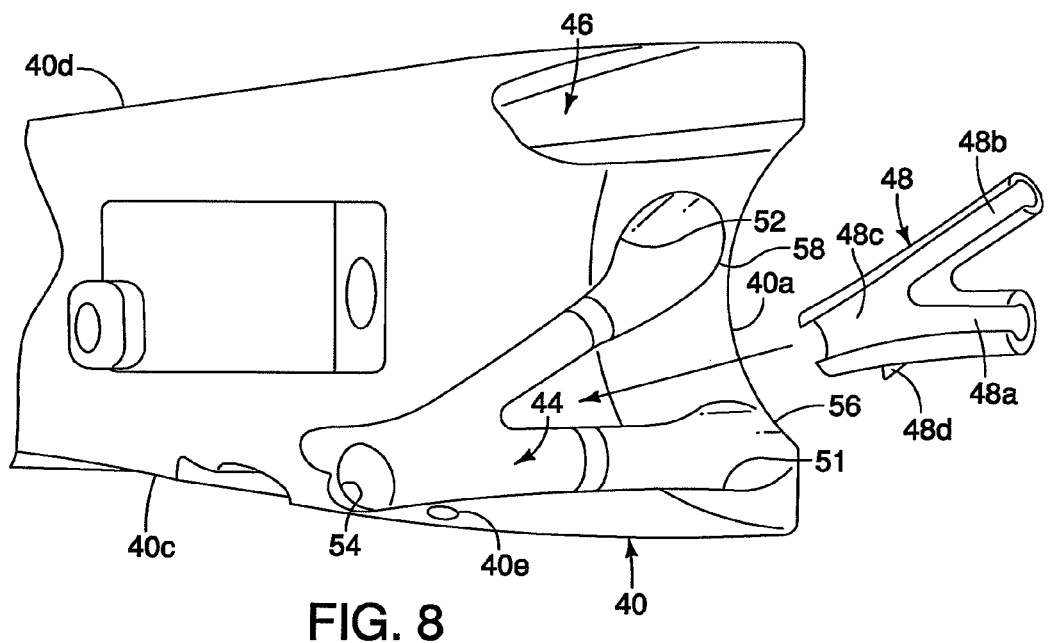
FIG. 8 is a partial top plan view of the attachment end of the body member of the left bicycle component (brake/shift) operating device with the insert element exploded out from the body member.

As best seen in FIGS. 7 and 8, the body member 40 has a first (shift) cable receiving recess 44 for receiving the shift control cable 24 and a second (brake) cable receiving recess 46 for receiving the brake control cable 26. The cable receiving recess 44 is designed with two cable routing paths for the shift control cable 24 as explained below. An insert element 48 is disposed in the cable receiving recess 44. The body member 40 is preferably formed of a first material having a first coefficient of friction, and the insert element 48 is preferably formed of a second material having a second coefficient of friction that is lower than the first coefficient of friction of the body member 40. Generally speaking, the precise construction of the rest of the body member 40 is not relevant, and thus, the construction of portions of the body member 40 that are not relevant will not be discussed or illustrated in detail.

The cable receiving recess 44 has a first wiring channel 51 and a second wiring channel 52 that merge together at an inner wire opening 54 of the body member 40. The inner wire opening 54 of the body member 40 is disposed adjacent the first (outer) side wall 40c. The first and second wiring channels 51 and 52 of the body member 40 are arranged in a V-shape with an apex of the V-shape disposed adjacent the inner wire opening 54 of the body member 40. Thus, the first and second wiring channels 51 and 52 extend from the inner wire opening 54 to first and second exit points 56 and 58, respectively. In other words, a first cable routing path is formed by the first wiring channel 51 extending from the inner wire opening 54 to the first exit point 56 and a second cable routing path is formed by the second wiring channel 52 extending from the inner wire opening 54 to a second exit point 58 that is spaced apart from the first exit point 56.

As best seen in FIG. 7, the insert element 48 has a first channel portion 48a corresponding to the first wiring channel 51, and a second channel portion 48b corresponding to the second wiring channel 52. The first and second channel portions 48a and 48b merge together along common channel portion 48c. Thus, the first and second channel portions 48a and 48b are disposed in the cable receiving recess 44 of the body member 40. More specifically, the first channel portion 48a is disposed in the first wiring channel 51 of the cable receiving recess 44, and the second channel portion 48b is disposed in the second wiring channel 52 of the cable receiving recess 44. The free ends of the first and second channel portions 48a and 48b form outer casing abutments for contacting the outer casing 24b of the shift control cable 24.

As best seen in FIGS. 9 to 11, the portions 48a, 48b and 48c of the insert element 48 are formed as a one-piece, unitary plastic member. For example, insert element 48 is formed of polyacetal (POM). The first channel portion 48a and the second channel portion 48b are thus rigidly connected in a predetermined orientation with respect to each other as a unit. The first and second channel portions 48a and 48b of the insert element 48 are arranged in a V-shape with an apex of the V-shape disposed adjacent the inner wire opening of the body member 40. The first channel portion 48a of the insert element 48 extends along the first (outer) side wall 40c of the body member 40 when the insert element 48 is disposed in the cable receiving recess 44 of the body member 40. The second channel portion 48b of the insert element 48 extends toward the second (inner) side wall 40d of the body member 40 when the insert element 48 is disposed in the recess of the body member 40. As seen in FIGS. 3-11, each of the first and second channel portions 48a and 48b are longitudinally extending open channels which are exposed while the insert element 48 is disposed in the recess 44 of the rigid body member 40, as seen in FIGS. 3-11.

In the illustrated embodiment, the insert element 48 is retained in the cable receiving recess 44 of the body member 40 by a snap-fit arrangement in which the body member 40 includes a first positioning structure and the insert element 48 includes a second positioning structure. Preferably, one of the first and second positioning structures is a protrusion and the other one of the first and second positioning structures is a protrusion is a recess. In the illustrated embodiment, the body member 40 includes a hole 40e forming a recess in the first wiring channel 51 that constitutes the first positioning structure, and the insert element 48 includes a protrusion 48d on the first channel portion 48a that constitutes the second positioning structure. The protrusion 48d (i.e., the second positioning structure) mates with the hole 40e (i.e., the first positioning structure) to form the snap-fit arrangement.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle component operating device comprising:
   a base member including a handlebar mounting structure and a rigid body member defining a recess with an inner wire opening;
   an operating member directly mounted to the rigid body member and pivotably coupled to a pivot axis located on the rigid body member to operatively pull and release an inner wire; and
   an insert element having a first channel portion and a second channel portion disposed in the recess of the body member, the first and second channel portions being rigidly connected together as a unit in a predetermined orientation with respect to each other, the first and second channel portions both being arranged with respect, to the base member to guide the inner wire to the inner wire opening, the first channel portion being separated from the second channel portion and forming an angle greater than zero therebetween.

2. The bicycle component operating device according to claim 1, wherein
   the body member is formed of a first material having a first coefficient of friction, and the insert element is formed of a second material having a second coefficient of friction that is lower than the first coefficient of friction of the body member.

3. The bicycle component operating device according to claim 2, wherein
   the first and second channel portions of the insert element are formed as a one-piece, unitary plastic member.

4. The bicycle component operating device according to claim 3, wherein
   the first and second channel portions of the insert element are arranged in a V-shape with an apex of the V-shape disposed adjacent the inner wire opening of the body member.

5. The bicycle component operating device according to claim 1, wherein
   the body member includes a first side wall and a second side wall, and the inner wire opening is disposed adjacent the first side wall.

6. The bicycle component operating device according to claim 5, wherein
   the first channel portion of the insert element extends along the first side wall of the body member when the insert element is disposed in the recess of the body member, and
   the second channel of the insert element extends toward the second wall of the body member when the insert element is disposed in the recess of the body member.

7. The bicycle component operating device according to claim 1, further comprising
   a shift control unit mounted to the base member with the operating member operatively coupled to the shift control unit.

8. The bicycle component operating device according to claim 1, further comprising
   a brake lever pivotally coupled to the base member.

9. The bicycle component operating device according to claim 1, wherein
   each of the first and second channel portions are longitudinally extending open channels which are exposed while the insert element is disposed in the recess of the rigid body member.

10. The bicycle component operating device according to claim 1, wherein
    the insert element is disposed at least partially above the operating member with the insert element disposed in the recess of the body member.

11. A bicycle component operating device comprising:
a base member including a handlebar mounting structure and a rigid body member defining a recess with an inner wire opening;
an operating member directly mounted to the rigid body member and pivotably coupled to a pivot axis located on the rigid body member to operatively pull and release an inner wire; and
an insert element having a first channel portion and a second channel portion disposed in the recess of the body member, the first and second channel portions being rigidly connected together as a unit in a predetermined orientation with respect to each other, the first and second channel portions both being arranged with respect to the base member to guide the inner wire to the inner wire opening, the first channel portion being separated from the second channel portion and forming an angle greater than zero therebetween,
the body member including a first positioning structure, and the insert element including a second positioning structure that mates with the first positioning structure to form a snap-fit arrangement.

12. The bicycle component operating device according to claim 11, wherein
one of the first and second positioning structures is a protrusion and the other of the first and second positioning structures is a recess.

13. A bicycle component operating device comprising:
a base member including a handlebar mounting structure and a body member defining a recess with an inner wire opening;
an operating member directly mounted to the body member and pivotably coupled to a pivot axis located on the body member to operatively pull and release an inner wire; and
an insert element having a first channel portion and a second channel portion disposed in the recess of the body member, the first and second channel portions of the insert element being formed as a one-piece, unitary plastic member such that the first and second channel portions are rigidly connected together as a unit in a predetermined orientation with respect to each other, the first and second channel portions both being arranged with respect to the base member to guide the inner wire to the inner wire opening, the insert element having a wall that separates the first channel portion from the second channel portion, the first channel portion being separated from the second channel portion and forming an angle greater than zero therebetween.

14. The bicycle component operating device according to claim 13, wherein
the first and second channel portions of the insert element are arranged in a V-shape with an apex of the V-shape defining one end of the wall.

15. The bicycle component operating device according to claim 13, wherein
the first and second channel portions of the insert element merge together along a common channel portion of the insert element, the common channel portion aligning with the inner wire opening of the base member.

16. The bicycle component operating device according to claim 15, wherein
the common channel portion begins where the wall of the insert element ends.

17. A bicycle component operating device comprising:
abuse member including a handlebar mounting structure and a body member defining a recess with an inner wire opening and with first and second wiring channels that respectively lead to first and second wire exit openings of the base member, the first and second wire exit openings being spaced from each other;
an operating member directly mounted to the body member and pivotably coupled to a pivot axis located on the body member to operatively pull and release an inner wire; and
an insert element having a first channel portion and a second channel portion disposed in the recess of the body member, the first and second channel portions being rigidly connected together as a unit in a predetermined orientation with respect to each other, the first and second channel portions both being arranged with respect to the base member to guide the inner wire to the inner wire opening, the first channel portion being separated from the second channel portion and forming an angle greater than zero therebetween.

18. The bicycle component operating device according to claim 17, wherein
the first and second channel portions are disposed in the first and second wiring channels, respectively.

19. The bicycle component operating device according to claim 17, wherein
the insert element further includes a common channel portion,
the first and second channel portions of the insert element converge together at the common channel portion to define a V-shape, and
the insert element fits into the recess of the base member such that the common channel portion of the insert element aligns with the inner wire opening.

20. The bicycle component operating device according to claim 17, wherein
the first wiring channel extends from the inner wire opening to the first wire exit opening to form a first cable routing path, and the second wiring channel extends from the inner wire opening to the second wire exit opening to form a second cable routing path.

21. A bicycle component operating device comprising:
a base member including a handlebar mounting structure and a body member defining a recess with an inner wire opening and with first and second wiring channels that respectively lead to first and second wire exit openings of the base member, the first and second wire exit openings being spaced from each other;
an operating member directly mounted to the body member and pivotably coupled to a pivot axis located on the body member to operatively pull and release an inner wire; and
an insert element having a first channel portion and a second channel portion disposed in the recess of the body member, the first and second channel portions being rigidly connected together as a unit in a predetermined orientation with respect to each other, the first and second channel portions both being arranged with respect to the base member to guide the inner wire to the inner wire opening, the first channel portion being separated from the second channel portion and forming an angle greater than zero therebetween,
the body member including a first positioning structure, and the insert element including a second positioning structure that mates with the first positioning structure to form a snap-fit arrangement such that the first and second channel portions are disposed in the first and second wiring channels, respectively.

\* \* \* \* \*